United States Patent Office 3,083,230
Patented Mar. 26, 1963

---

3,083,230
ALKYLCHLOROALKYLBORANES
Peter R. Girardot, Akron, Ohio, and Lawrence Zeldin, deceased, late of Madison, Wis., by John M. Diehl, special administrator, Madison, Wis., assignors to Callery Chemical Company, Pittsburgh, Pa., a corporation of Pennsylvania
No Drawing. Filed Feb. 19, 1960, Ser. No. 9,717
5 Claims. (Cl. 260—606.5)

This invention relates to alkylchloroalkylboranes, and their preparation.

Alkylhaloboranes have been studied by several investigators in the past, who used various methods for their preparation. For example, alkylbromoboranes, $R_2BBr$ and $RBr_2$ where R is n-butyl, were prepared by Johnson et al. by the action of bromine on tributylborane; their results were reported at page 115, volume 60 of the Journal of the American Chemical Society. Others have prepared analogous derivatives from the trialkylborane and hydrogen halides. However, in all cases the compounds produced contained halogen atoms directly attached to the boron and in no case has there been reported any compound in which an alkyl group of the trialkylborane is substituted with a halogen.

It is accordingly one object of this invention to provide new compounds of boron in which an alkyl group attached to the boron is substituted with chlorine.

Another object is to provide a method of preparing these new compounds of boron.

Other objects will become apparent from time to time throughout the following specification and claims.

The basis for this invention lies largely in the unexpected discovery that the controlled reaction of chlorine with a tri-lower alkylborane produces compounds in which one of the alkyl groups attached to the boron is substituted with chlorine. These compounds may be represented by the formula $(C_nH_{2n+1})_2BC_nH_{2n+1-x}Cl_x$ where the group $C_nH_{2n+1}$ is a lower alkyl radical and $x$ is an integer from 1 to 2. For example, the reaction of trimethylborane with chlorine produces dimethylchloromethylborane, $(CH_3)_2BCH_2Cl$, and dimethyldichloromethylborane, $(CH_3)_2BCHCl_2$; the products obtained from triethylborane are diethylchloroethylborane, $(C_2H_5)_2BC_2H_4Cl$ and diethyldichloroethylborane, $$(C_2H_5)_2BC_2H_3Cl_2$$

Other tri-lower alkylboranes react similarly.

The reaction takes place upon contact of chlorine with the trialkylborane. The temperature which may be used depends upon the trialkylborane employed in the reaction. When very volatile trialkylboranes are used, e.g., trimethylborane, the reaction is explosively violent at temperatures above about 0° C.; consequently it is necessary to mix the reactants at low temperatures and to maintain the temperature below about 0° C. until the reaction is substantially complete in order to obtain the desired products in satisfactory yields. Other less volatile trialkylboranes are less reactive and therefore room temperature or somewhat above is necessary to induce a sufficient rate of reaction.

It has been found that the method of this invention is not applicable to halogens other than chlorine. For example, reaction of trimethylborane and bromine yielded only dimethylbromoborane and methyl bromide, thus corroborating the work of previous investigators. Similarly, the use of hydrogen chloride resulted in the production of dimethylchloroborane, in accordance with prior reported data. Thus it appears that the reaction with chlorine is unique in that it produces products in which the halogen is substituted into the alkyl groups and not attached to the boron atom.

The invention will be described further in conjunction with the following examples. The examples should not be construed as limiting the invention but are to be taken as illustrating the method used and the products obtained.

*Example 1.*—Chlorine (approximately 13 millimoles) and trimethylborane (14.5 millimoles) were successively condensed into a 500 cc. reaction bulb at —196° C. The mixture was warmed to —95° C. After 20 minutes, the chlorine color had disappeared and liquid droplets had formed on the walls of the bulb. It was then warmed to room temperature. Low temperature fractionation of the resultant mixture gave 11 millimoles of hydrogen chloride, 5.9 millimoles of unreacted trimethylborane, 8.7 millimoles of dimethylchloromethylborane, $$(CH_3)_2BCH_2Cl$$

or an 80% yield based on chlorine, and 0.7 millimole of dimethyldichloromethylborane, $(CH_3)_2BCHCl_2$, or a 13% yield based on chlorine. The products were identified by molecular weight determination, vapor pressures, and elemental analysis.

*Example 2.*—A reaction bulb was charged with trimethylborane and 9.24 millimoles of chlorine at —196° C. After 30 minutes at —95° C. the mixture was gradually warmed to room temperature. Fractional distillation of the products gave a 68.4% yield of dimethylchloromethylborane and approximately a 15% yield of dimethyldichloromethylborane.

The desired products of the reaction tend to form association complexes with the by-product hydrogen chloride, which require careful and repeated fractionation to recover the pure products. It has been found that the desired products are more easily separated if an excess of chlorine is avoided. For this reason, it is preferred to use about a 1 to 1 molar ratio of chlorine to trialkylborane.

Since the trialkylboranes tend to oxidize rapidly in the presence of oxygen, it is necessary that the reaction be carried out in an atmosphere such that oxygen is essentially excluded. For this purpose, the reaction is carried out by evacuating the reaction vessel prior to introduction of the reactants, or an inert gas, such as nitrogen or argon, is used to blanket the reactants. The absence of oxygen is especially necessary when the lower members of the trialkylborane series, e.g., trimethylborane and triethylborane, are used, since these compounds are spontaneously inflammable in air.

The dialkylchloroalkylboranes are relatively high-boiling liquids. In order to illustrate the nature of these substances as they are prepared according to this invention, certain physical properties of the methyl compounds are tabulated below.

*Dimethylchloromethylborane,* $(CH_3)_2BCH_2Cl$

Molecular weight:
 Calculated—90.4
 Found—92.5
Vapor pressures:
 —45° C.—3 millimeters of mercury
 —23° C.—12 millimeters of mercury
 0° C.—44 millimeters of mercury
 20° C.—107 millimeters of mercury
Boiling point: 74.5° C. (extrapolated)
Elemental analysis (in percent):
 Calculated—B, 12.0; Cl, 39.2
 Found—B, 12.4; Cl, 36.1

*Dimethyldichloromethylborane,* $(CH_3)_2BCHCl_2$

Molecular weight:
 Calculated—124.8
 Found—123

Vapor pressures:
 −23° C.—4 millimeters of mercury
 0.5° C.—18 millimeters of mercury
 21° C.—39 millimeters of mercury
Boiling point: 119° C. (extrapolated)

The alkylchloralkylboranes, for example, $$(CH_3)_2BCHCl_2$$

and $(CH_3)BCH_2Cl$, are useful as polymerization catalysts for vinyl compounds, such as vinyl chloride and vinyl acetate. Use of these compounds in low concentrations results in a moderate rate of polymerization even at low temperatures, making possible the production of polymers with regular head-to-tail structure or with no side chains. It is believed that these compounds act as anionic initiators in such polymerizations.

According to the provisions of the patent statutes, we have explained the principle and mode of practicing our invention, have described what we now consider to be its best embodiments. However, we desire to have it understood that within the scope of the appended claims, the invention may be practiced otherwise than as specifically described.

We claim:
1. A method of preparing methylchloromethylboranes, $(CH_3)_2BCH_{3-x}Cl_x$ where $x$ is an integer from 1 to 2, which comprises reacting trimethylborane with chlorine in an atmosphere essentially free from oxygen, while maintaining the temperature below about 0° C., and recovering the methylchloromethylboranes thus formed.
2. A method according to claim 1 in which the molar ratio of trimethylborane to chlorine is about 1 to 1.
3. Dimethylchloromethylborane, $(CH_3)_2BCH_2Cl$.
4. Dimethyldichloromethylborane, $(CH_3)_2BCHCl_2$.
5. Compounds having the formula $(CH_3)_2BCH_nCl_{3-n}$ in which $n$ is a whole integer from 1 to 2.

References Cited in the file of this patent
UNITED STATES PATENTS 2,918,498   Clark et al. _____ Dec. 22, 1959

OTHER REFERENCES

Cummings: Dissertation Abstracts, vol. 18, pp. 1978–9 (1958).

Hawthorne et al.: J. Am. Chem. Soc., vol. 80, pp. 5830–2 (1958).